L. E. & T. J. BLUNT.
HAME FASTENER.
APPLICATION FILED JULY 21, 1913.
1,161,443.
Patented Nov. 23, 1915.
2 SHEETS—SHEET 2.
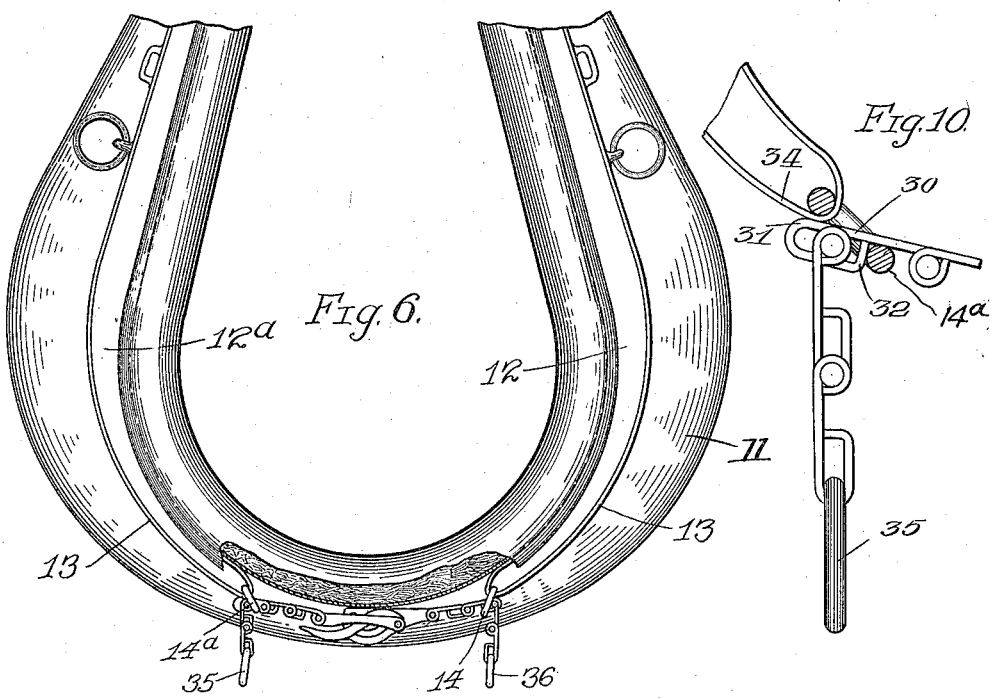
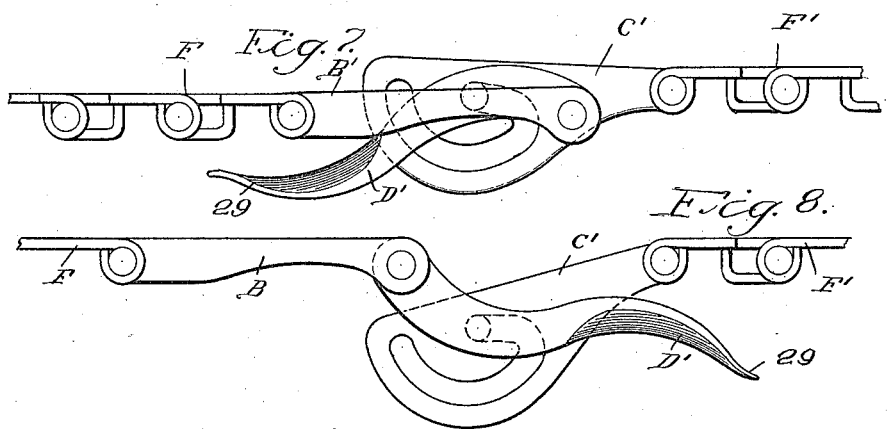

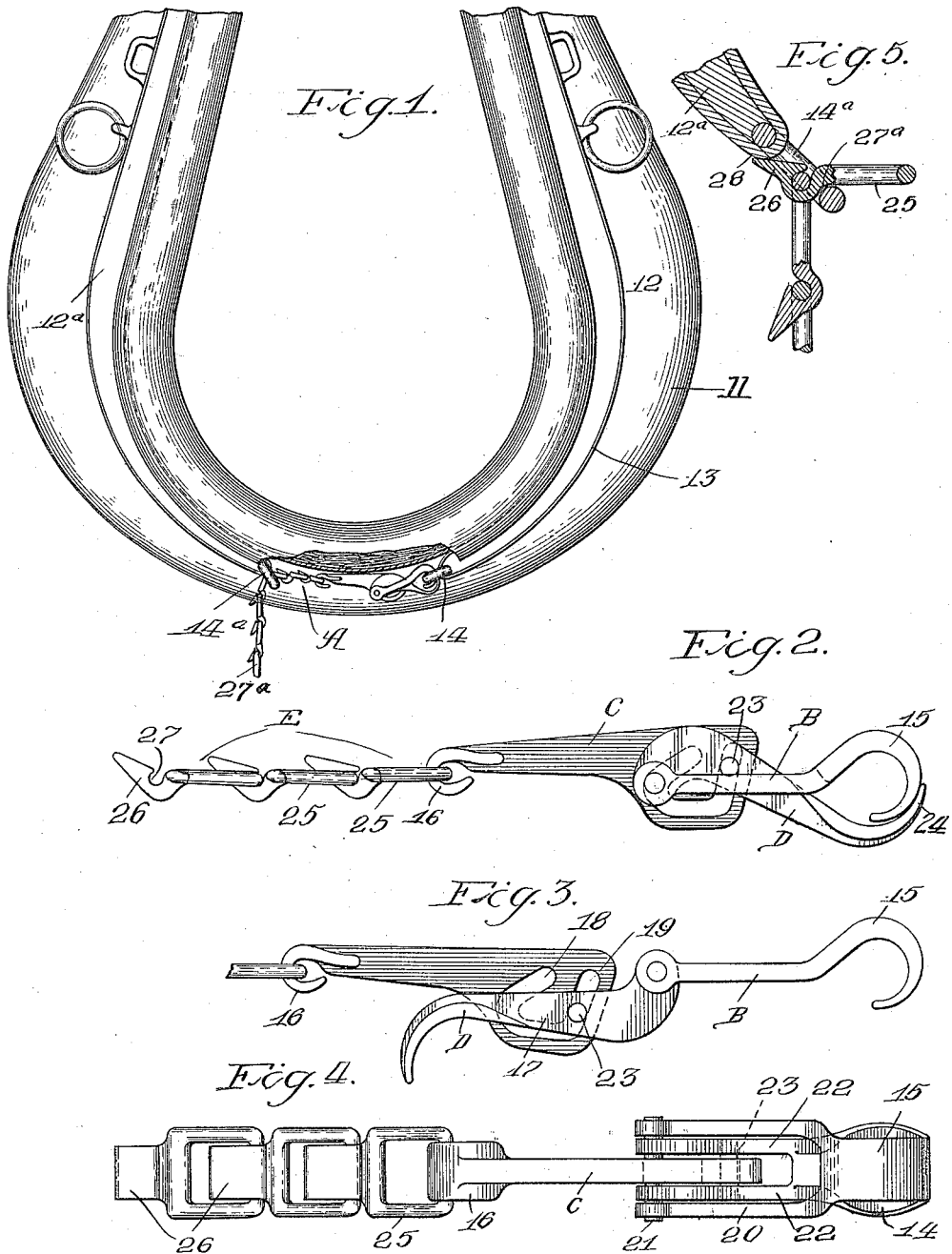

UNITED STATES PATENT OFFICE.

LAURIEN E. BLUNT, OF WILMETTE, AND THOMAS J. BLUNT, OF CHICAGO, ILLINOIS.

HAME-FASTENER.

1,161,443.　　　Specification of Letters Patent.　　Patented Nov. 23, 1915.

Application filed July 21, 1913.　Serial No. 780,384.

*To all whom it may concern:*

Be it known that we, LAURIEN E. BLUNT and THOMAS J. BLUNT, citizens of the United States, residing at Wilmette and Chicago, respectively, in the county of Cook and State of Illinois, have invented new and useful Improvements in Hame-Fasteners, of which the following is a full, clear, concise, and exact description, reference being had to the accompanying drawings, forming a part of this specification.

Our invention relates to improvements in hame fasteners and has for its object the production of a device by means of which the hames may be securely locked in position and may at the same time be readily fastened and unfastened.

A further object is the production of a device in which extreme nicety of adjustment may be obtained without sacrificing efficiency.

A further object is the production of a device that may be simply and cheaply constructed and one that is not liable to get out of order, and also one that cannot be accidentally disengaged when in operative position.

These and such other objects as may be hereinafter set forth are attained by our device, embodiments of which are illustrated in the accompanying drawings, in which—

Figure 1 represents a portion of a horse collar and hames with our device in operative position thereon; Fig. 2 represents a side elevation of our device in locked position; Fig. 3 represents a portion of our device in unlocked position; Fig. 4 represents a top plan view of Fig. 2; Fig. 5 represents a sectional view through the locking link when the device is in operative position; Fig. 6 represents a view similar to Fig. 1 showing a modified form of our device; Fig. 7 represents a plan view of the modified form of our device in locked position; Fig. 8 represents a plan view of a portion of our device in unlocked position; Fig. 9 represents a top plan view of Fig. 7; Fig. 10 represents a sectional view through the locking link of the modified form of our device when in operative position.

Like characters of reference indicate like parts in the several figures of the drawings.

Referring now to the drawings, 11 represents an ordinary form of horse collar on which is mounted the hame comprising bows 12 and 12ª. These bows carry the customary rings and fastening means for the various portions of the harness and are ordinarily bound with metal, shown at 13 and are provided at their ends with swinging links 14—14ª.

Our improved fastener A is shown in Fig. 1 in operative position holding the bows of the hame tightly in place against the roll of the collar.

Our device proper comprises a lever supporting member B, an adjusting member C and a lever D and chain E.

The member B terminates in a hooked end 15 adapted to engage the link 14 and the adjusting member C is provided at its rear end with a hook 16 to which is attached a securing chain E. The adjusting member C is preferably formed of a piece of flat metal and provided with a cam track 17 terminating in two upwardly extending branches, 18—19.

The member B is preferably formed with parallel forks 20 the lever D being pivotally mounted within the forked bearings 21, thus permitting the lever to swing between the forked arms 20. The lever D is also forked and its forked arms designated as 22—22. A pin 23 connects the forks 22 and passes through the cam track 17 in the member C, the member C itself fitting between the forked arms of the members B and D. It will be noted that the members B and D together form a single structure movable on the member C to the extent that such movement is permitted by the path of the cam track. When the device is in position as shown in Fig. 1, the lever D is swung upwardly and its end 24 fits against the end of the hook 15, the pin 23 bearing against the inner face of the groove in the cam track at a point considerably above the level of the bearing 21, thus holding the device in locked position.

Referring now to the chain E by means of which the member C is fastened to the link 14ª, it will be noted that this chain comprises a plurality of links 25 each terminating in forwardly extending lugs or shoulders 26, recesses 27 being formed in each shoulder for the reception of the next link in the chain. When this device is used, we pass the end of the chain E through the link 14ª on the hame bow 12ª and insert some form of retaining ring, preferably a ring 27ª of sufficient size to prevent the chain from falling out of the link 14ª. The chain is then pulled through and the hook 15 fastened to the link 14. It will be noted that as long as any considerable tension is brought on the chain it will pull the hame bows together in the position shown in Fig. 1, at which time the shoulder 26 will engage the end of the hame bow as shown at 28 in Fig. 5, the shoulder 27ª at the opposite end of the lug bearing against the link and pulling it forwardly. The device will then be in the position shown in Fig. 3. The lever D is then swung around into locking position as shown in Figs. 1 and 2. If it is found that the fastener is still too loose and it is impossible to take up another link of the chain E the lever is swung back and the hook 15 detached and the pin 23 forced backwardly along the cam track and up into the end 18. The lever is then swung back into the locked position and the cam fastener will be found to be taut and in the desired position.

It will be noted that the chain E will always be locked securely in place when tension is applied for the reason that even the slightest tension causes the link 14ª to swing inwardly and throw the lug or shoulder of the individual link against the end of the hame bow.

In the modification of our device illustrated on Sheet 2 of the drawing, it will be noted that the hooked end 15 is dispensed with and a chain F substituted therefor, a similar chain F' being attached to the opposite end of the member C'. Except for the substitution of the chain for the hook, the member B' is practically the same as the member B in the preferred form.

The lever D' in this form is of the ordinary shape, slightly curved and distinguished from the sharp curvature shown at 24 in Fig. 2, the lever terminating rather in an ordinary handle 29. The chain shown on the second sheet of the drawing is preferably formed from pressed steel, the link member 30 extending a considerable distance forming a shoulder 31 and provided with an upset end 32 forming a shoulder adapted to strike against the link 14ª when the chain is in operative position and pull such link forward until the shoulder 31 at the opposite end strikes the end of the hame bow as shown at 34.

In using this form of our device, after the chain F is passed through the link 14ª a large link or securing means 35 is mounted on the end so as to prevent the device from slipping out of the link. A smaller link 36 is also mounted on the end of the chain F' but of such a size as to permit its being slipped through the link 14. In fastening the hames in place the chain is pulled fairly taut, as with the other device, and the lever D' swung around, locking the hame bows together, as shown in Fig. 7. It will be noted that there is absolutely no chance of the chain slipping, as the shoulders formed by the upset ends 32 bear against the lower side of the link 14ª pulling it inwardly until the shoulder 31 on the opposite end of the link strikes the metallic end of the hame bow.

Our device is of extremely simple construction and one that can be readily attached and detached without loss of time. In either form shown the entire device is secured together firmly, an integral structure, and swung on the link of one of the hame bows, and when it is desired to secure the hame bows together it is simply necessary to swing the free end of the device through or into engagement with the opposite link 14. The parts may then be brought together and pulled taut, and tightened as heretofore described. To loosen the fasteners, it is simply necessary to swing the lever backward and the tension is at once released and the hames may be readily removed from the collar. The chains may either be formed of cast links or pressed steel and the other operative parts of brass or any suitable composition.

While we have described and illustrated our device as a hame fastener and have referred also to its use in such action, we do not contemplate such limitations in actual use as it is clearly apparent that a device of this character may be advantageously used in many other instances where it is necessary or desirable to tighten securing means, such, for instance, as chains used in holding logs, ties or poles in place on a vehicle or a car. The device of course used in such a contingency would be very much larger, but would involve the same principles. The lever of course might be several feet long instead of inches and the parts themselves greatly increased in size and formed from cast or rod metal. Numerous other instances will doubtless occur to anyone in which our invention may be made of use. It is therefore to be clearly understood that by the designation of our invention as hame fastener we do not limit ourselves to its use as such.

We claim:

1. In a hame fastener, the combination of a lever supporting member, a lever, an adjusting member permanently united to the supporting member and adjustable means for securing said member upon the hames.

2. In a fastener for hames, the combination of a lever supporting member, a lever, an adjusting member provided with a closed cam track, said first member being movably mounted within said cam track, both of said members being permanently united together and means for securing said members in operative position.

3. In a hame fastener, the combination of a lever supporting member, a lever, an adjusting member permanently secured thereto and a chain member for securing said first named members to the hames.

4. In a hame fastener, the combination of a lever supporting member, a lever, an adjusting member permanently secured thereto, a chain member for securing said first named members to the hames, and means for automatically locking said chain without disconnecting the parts.

5. In a hame fastener, the combination of a lever supporting member, a lever, an adjusting member permanently secured thereto, a chain member for securing said first named members to the hames and means for automatically locking said chain when under tension, said means comprising rearwardly projecting shoulders adapted to engage said hames.

6. In a hame fastener, the combination of a lever supporting member, a lever, an adjusting member permanently secured thereto, chain securing members, and links mounted on the extreme end of said hames through which chain members are passed.

7. The combination of a hame fastener with the hame bows and links depending therefrom, a lever supporting member, a lever, an adjusting member permanently secured thereto, chain members permanently secured to said first named members and adapted to pass through said links and means for holding the hame fastener under tension.

8. The combination of a hame fastener with hame bows and pending links, a lever supporting member engaged with one hame link, an adjusting member, a lever connected to said supporting member and to said adjusting member, and a chain comprising a plurality of links secured to said adjusting member and arranged to pass through the other hame link, each chain link being formed with portions arranged to engage a hame and its hame link respectively and lock such chain link to the hame and to the hame link when said fastener is in operative position.

9. The combination of a hame fastener, with hame bows and pending links, a chain comprising a plurality of links arranged to pass through one hame link, each chain link being formed with portions arranged to engage such hame and its link respectively and lock such chain link to said hame and hame link when said fastener is in operative position, and means for adjustably connecting to the other hame links the end of the chain nearest said last named link.

10. The combination of a hame fastener with hame bows and rings depending therefrom, a lever supporting member, a lever, an adjusting member permanently united thereto; a chain member associated therewith and passing through one of said rings, and a hook associated with said lever for attaching the fastener to the other of said rings, said lever being so formed as to lock said hook in place when said lever is placed in locking position.

LAURIEN E. BLUNT.
THOMAS J. BLUNT.

Witnesses:
F. H. DRURY,
ANNE SOLOMON.

Copies of this patent may be obtained for five cents each, by addressing the "Commissioner of Patents, Washington, D. C."